US010920830B2

(12) United States Patent
Hallgren et al.

(10) Patent No.: US 10,920,830 B2
(45) Date of Patent: Feb. 16, 2021

(54) MIXER COMPRISING A CLAMPING SLEEVE ASSEMBLY

(71) Applicant: Xylem Europe GmbH, Schaffhausen (CH)

(72) Inventors: Gert Hallgren, Hägersten (SE); Tatjana Nechaeva, Järfälla (SE)

(73) Assignee: Xylem Europe GmbH, Schaffhausen (CH)

( * ) Notice: Subject to any disclaimer, the term of this patent is extended or adjusted under 35 U.S.C. 154(b) by 0 days.

(21) Appl. No.: 16/470,589

(22) PCT Filed: Dec. 18, 2017

(86) PCT No.: PCT/EP2017/083197
§ 371 (c)(1),
(2) Date: Jun. 18, 2019

(87) PCT Pub. No.: WO2018/114736
PCT Pub. Date: Jun. 28, 2018

(65) Prior Publication Data
US 2019/0345983 A1    Nov. 14, 2019

(30) Foreign Application Priority Data

Dec. 19, 2016  (EP) ................... 16205126

(51) Int. Cl.
*F16D 1/097* (2006.01)
*B01F 7/00* (2006.01)
*F04D 29/60* (2006.01)

(52) U.S. Cl.
CPC ............ *F16D 1/097* (2013.01); *B01F 7/001* (2013.01); *B01F 7/00341* (2013.01); *F04D 29/605* (2013.01)

(58) Field of Classification Search
CPC .... F16D 1/097; F04D 29/605; B01F 7/00341; B01F 7/001
(Continued)

(56) References Cited

U.S. PATENT DOCUMENTS 2,574,773 A * 11/1951 Bannister ................ B21B 19/02
403/37
3,803,691 A *  4/1974 Geese .................. B21B 27/035
403/15
(Continued)

FOREIGN PATENT DOCUMENTS

DE    3607505 C1 *  5/1987  ............... B04B 9/08
DE    3607505 C1     5/1987
(Continued)

OTHER PUBLICATIONS

International Preliminary Report on Patentability for International Application No. PCT/EP2017/083197, dated Nov. 21, 2018—7 pages.
(Continued)

*Primary Examiner* — Charles Cooley
(74) *Attorney, Agent, or Firm* — RatnerPrestia

(57) ABSTRACT

A mixer for generating a flow of liquid includes a stationary body, an axially extending drive shaft protruding from the stationary body, a propeller, and a clamping sleeve assembly configured to interconnect the drive shaft and the propeller with each other in order to transmit a rotational motion. The clamping sleeve assembly has an axial clamping length and includes an inner clamping sleeve and an outer clamping sleeve. The inner clamping sleeve has the shape of a tubular wall having an inner surface abutting the drive shaft and an outer surface abutting the outer clamping sleeve and wherein the outer clamping sleeve has the shape of a tubular wall having an inner surface abutting the inner clamping sleeve and an outer surface abutting the propeller. Both the inner
(Continued)

surface of the outer clamping sleeve and the outer surface of the inner clamping sleeve are cylindrical along the axial clamping length.

10 Claims, 4 Drawing Sheets

(58) Field of Classification Search
USPC .......................................................... 366/331
See application file for complete search history.

(56) References Cited

U.S. PATENT DOCUMENTS

| | | | | |
|---|---|---|---|---|
| 4,304,502 | A * | 12/1981 | Stratienko | F16D 1/094 403/370 |
| 4,456,382 | A * | 6/1984 | Mahler, II | B01F 7/001 366/276 |
| 4,776,834 | A | 10/1988 | Müller et al. | |
| 4,988,303 | A * | 1/1991 | Thomas | B01F 7/001 366/285 |
| 5,152,606 | A * | 10/1992 | Borraccia | B01F 7/001 366/270 |
| 5,190,393 | A * | 3/1993 | Svensson | F16D 1/097 403/370 |
| 5,746,536 | A * | 5/1998 | Hutchings | F16B 3/06 403/358 |
| 6,390,723 | B1 * | 5/2002 | Schafer | B21B 27/035 403/15 |
| 7,726,946 | B2 * | 6/2010 | Hu | F04D 29/263 416/204 R |
| 8,496,394 | B2 * | 7/2013 | Schneider | F16B 3/06 403/370 |
| 2010/0074676 | A1 * | 3/2010 | Hallgren | F04D 29/20 403/243 |
| 2012/0275851 | A1 * | 11/2012 | Aarre | F16C 3/12 403/314 |
| 2013/0003495 | A1 * | 1/2013 | Pyddoke | B01F 7/001 366/343 |
| 2019/0345983 | A1 * | 11/2019 | Hallgren | F16D 1/097 |

FOREIGN PATENT DOCUMENTS

| | | | |
|---|---|---|---|
| EP | 0137759 A2 | 9/1984 | |
| EP | 3336372 A1 * | 6/2018 | .............. B01F 7/001 |
| JP | 59162934 A | 9/1984 | |
| JP | 2006112590 A | 4/2006 | |
| WO | WO-0183096 A1 * | 11/2001 | .............. B01F 7/001 |
| WO | 2011115552 A1 | 9/2011 | |

OTHER PUBLICATIONS

International Search Report and Written Opinion for International Application No. PCT/EP2017/083197, dated Feb. 15, 2018—13 pages.

* cited by examiner

MIXER COMPRISING A CLAMPING SLEEVE ASSEMBLY

TECHNICAL FIELD OF THE INVENTION

The present invention relates generally to the field of mixers suitable for generating a flow of liquid. The present invention relates specifically to the field of mixers comprising a clamping sleeve assembly configured to interconnect the mixer drive shaft and the mixer propeller with each other in order to transmit a rotational motion. The clamping sleeve assembly has an axial clamping length, the clamping sleeve assembly comprising an inner clamping sleeve and an outer clamping sleeve, wherein the inner clamping sleeve has the shape of a tubular wall having an inner surface abutting the drive shaft and an outer surface abutting the outer clamping sleeve and wherein the outer clamping sleeve has the shape of a tubular wall having an inner surface abutting the inner clamping sleeve and an outer surface abutting the propeller.

BACKGROUND OF THE INVENTION

Conventional mixers comprises a rotatable propeller mounted onto a mixer drive shaft, wherein said propeller must be interconnected to the drive shaft in a suitable way that provides a rigid and non-rotational mutual connection. At the same time it shall be possible to adjust the axial location of the propeller in relation to the drive shaft, in order to adjust the location of the propeller in relation to the stationary body/housing of the mixer, and it shall also be possible to demount the propeller from the drive shaft.

One known way to interconnect a mixer drive shaft and a mixer propeller to each other in order to transmit a rotational motion, is to use a key and key-way joint, which comprises a key that is inserted into opposite key-ways in the respective elements. Such a joint is often to a great extent appropriate but it is often difficult to release/demount the elements from each other without damaging them, it is also difficult to adjust the mutual axial location of the drive shaft and propeller.

Another known way to interconnect a drive shaft and a propeller to each other, is to use a tubular shaped clamping sleeve. The clamping sleeve is inserted into a centrally located recess in the propeller and then the drive shaft is inserted into said clamping sleeve. The propeller is forced towards the drive shaft by means of a bolt, which causes the clamping sleeve to become squeezed between the propeller and the drive shaft. Thus, by means of friction the clamping sleeve will transmit a rotational motion from the drive shaft to the propeller.

A disadvantage of known solutions is that a specific propeller having a central hole of a predetermined diameter only matches a specific mixer drive shaft using an optimized clamping sleeve. This lead to a great variety of propellers of the manufacturer, the only difference is the diameter of the central hole of the propeller, and this adds cost for the manufacturer.

Thereto, some prior art clamping sleeve assemblies comprises an inner clamping sleeve and an outer clamping sleeve, wherein the mating surfaces of the inner clamping sleeve and the outer clamping sleeve have conical shape in order to engage/clamp each other as a consequence of mutual axial displacement of the inner clamping sleeve and outer clamping sleeve.

OBJECT OF THE INVENTION

The present invention aims at obviating the aforementioned disadvantages and failings of previously known mixers having clamping sleeve assemblies, and at providing an improved mixer. A primary object of the present invention is to provide an improved mixer of the initially defined type with respect to the ability of transmitting a rotational motion between the mixer drive shaft and the mixer propeller at the same time as no mutual axial displacement of the inner and outer clamping sleeves is required. It is another object of the present invention to provide a mixer, which allows one specific propeller to fit several drive shafts having different diameters.

SUMMARY OF THE INVENTION

According to the invention at least the primary object is attained by means of the initially defined mixer having the features defined in the independent claim 1. Preferred embodiments of the present invention are further defined in the dependent claims.

According to the invention, there is provided a mixer of the initially defined type, which is characterized in that both the inner surface of the outer clamping sleeve and the outer surface of the inner clamping sleeve are cylindrical along the axial clamping length, the inner surface of the inner clamping sleeve, along the axial clamping length, having the shape of a truncated cone diverging towards a first end of the inner clamping sleeve, wherein the outer diameter of the inner clamping sleeve is less than the inner diameter of the outer clamping sleeve when both are unloaded, and wherein the tubular wall of the inner clamping sleeve comprises a slot extending along the entire axial length of the inner clamping sleeve and the tubular wall of the outer clamping sleeve comprises a slot extending along the entire axial length of the outer clamping sleeve.

Thus, the present invention is based on the insight of having two interrelated clamping sleeves connected in series between the mixer drive shaft and the propeller, a specific propeller designed for a mixer drive shaft having a certain diameter can also be used together with a mixer drive shaft having a smaller diameter thanks to the clamping sleeve assembly characterizing the inventive mixer. Thereto, if the condition of a specific mixer installation is changed over time a propeller designed for a thicker drive shaft can be attached to the thinner drive shaft of the present mixer using a clamping sleeve assembly characterizing the inventive mixer.

In a preferred embodiment of the present invention, the outer surface of the outer clamping sleeve is cylindrical along said axial clamping length, in order to allow axial adjustment of the propeller in relation to the stationary body of the mixer.

According to a preferred embodiment the entire inner surface of the inner clamping sleeve has the shape of a truncated cone, in order to simplify the production of the inner clamping sleeve.

According to a preferred embodiment the outer clamping sleeve comprises a bore delimited by the inner surface of the outer clamping sleeve and extending from a first end of the outer clamping sleeve towards a second end of the outer clamping sleeve, said bore ending at a first stop surface configured to directly or indirectly engage a second end of the inner clamping sleeve. Thereby, a well defined mutual position of the inner clamping sleeve and the outer clamping sleeve is automatically obtained during mounting.

According to a preferred embodiment, the tubular wall of the outer clamping sleeve comprises at least one slit extending from the first end of the outer clamping sleeve towards the second end of the outer clamping sleeve, in order to obtain better expansion in the radial direction towards the propeller. More preferably the tubular wall of the outer clamping sleeve comprises five slits that together with the slot of the outer clamping sleeve are equidistantly distributed along the circumferential direction of the tubular wall of the outer clamping sleeve, in order to obtain better expansion in the radial direction towards the propeller.

According to a preferred embodiment, the tubular wall of the inner clamping sleeve comprises at least one slit extending from the first end of the inner clamping sleeve towards a second end of the inner clamping sleeve, in order to obtain better expansion in the radial direction towards the outer clamping sleeve. According to a preferred alternative embodiment, the tubular wall of the inner clamping sleeve comprises at least one pair of slits extending from the first end of the inner clamping sleeve towards a second end of the inner clamping sleeve, providing a finger shaped segment of the tubular wall of the inner clamping sleeve delimited by the slits of the pair of slits. Such an alternative embodiment is especially useful in applications wherein the propeller is subject to jerks and the like, whereby the clamping forces of the inner clamping sleeve will automatically increase due to such jerks in the propeller.

According to a preferred embodiment, the outer clamping sleeve comprises a second stop surface configured to be engaged by the top of the head of an attachment screw during demounting of the clamping sleeve assembly. Thereby the propeller can be demounted from the drive shaft in a controlled way without damaging the propeller, the drive shaft or the clamping sleeve assembly.

Further advantages with and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein:

FIG. 11b is a schematic cross sectional view seen in the axial direction of the inner clamping sleeve disclosed in FIG. 11a.

DETAILED DESCRIPTION OF PREFERRED EMBODIMENTS OF THE INVENTION

Figures 1, 2:
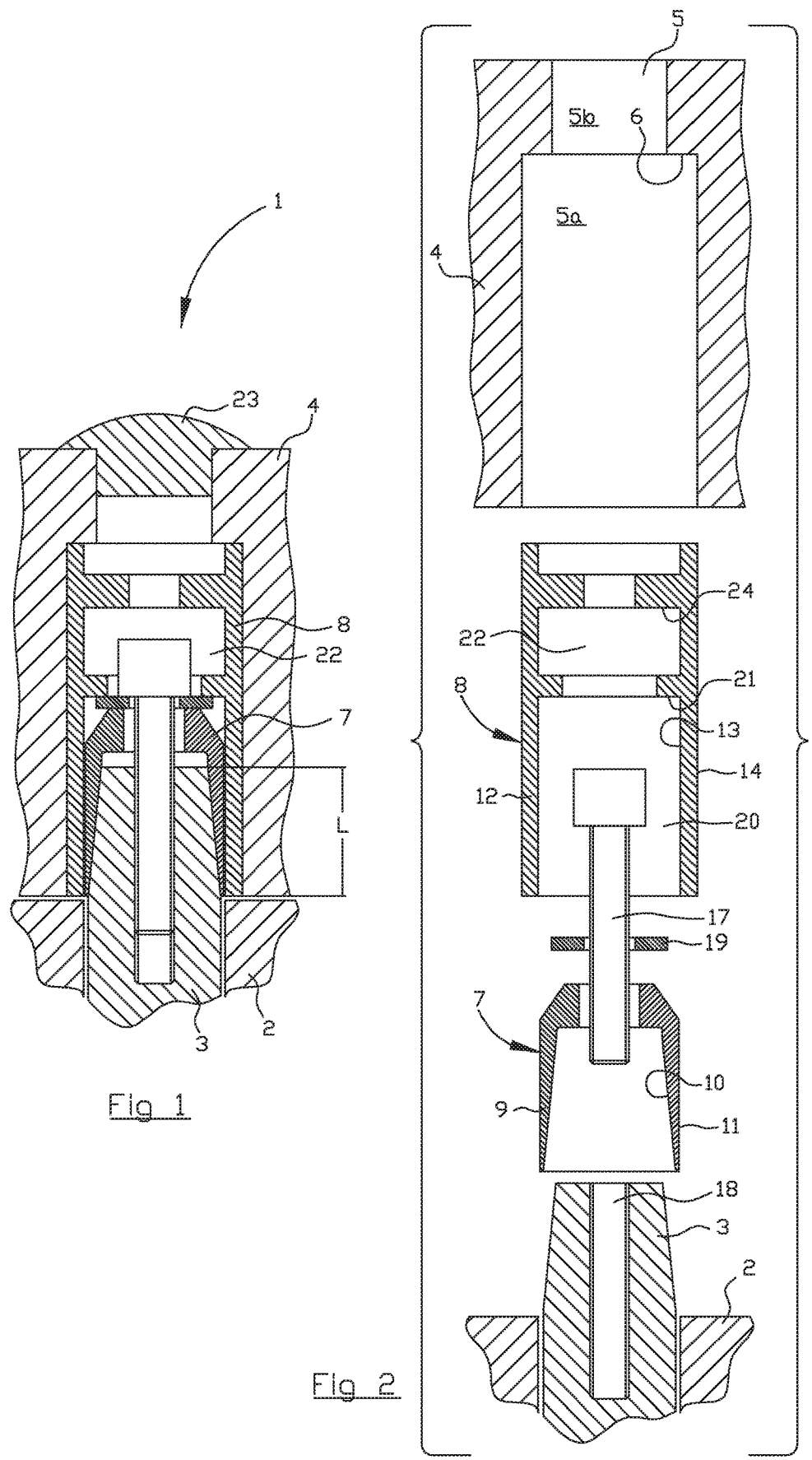
FIG. 1 is a schematic cross sectional side view of a part of an inventive mixer.
FIG. 2 is a schematic exploded cross sectional side view of the mixer elements disclosed in FIG. 1.

The present invention relates to a mixer for generating a flow of liquid, and the mixer will in the main be described with reference to FIGS. 1 and 2. FIG. 1 disclose schematically a cross sectional side view of a part of an inventive mixer, generally designated 1, and FIG. 2 disclose the corresponding part of the mixer 1 in an exploded side view. Even though the mixer has a broad applicability, i.e. to generate a flow of liquid, the inventive mixer is especially configured for use in a wastewater treatment plant or in a digester. Most parts of the mixer are removed for the sake of simplicity of reading the figures.

A mixer, more precisely a submersible mixer or a wastewater mixer, is designed and configured to be able to operate in a submerged configuration/position, i.e. during operation be located entirely under the liquid surface of a tank. Thus, an operative position of the submersible mixer is located inside the tank, and the operative position of the submersible mixer is in the preferred embodiment located at the lower region of the tank. It shall be realized that the submersible mixer during operation must not be entirely located under the liquid surface but may continuously or occasionally be partly located above the liquid surface in the tank. Mixers as referred to herein, comprises an electrical motor arranged in a liquid tight housing, preferably made of metal, and a drive shaft extending from the electrical motor. A propeller is connected to the drive shaft and is driven in rotation by said drive shaft and electrical motor during operation of the submersible mixer. The electrical motor is powered via an electrical cable extending from the top of the tank. The submersible mixer comprises a liquid tight lead-through receiving the electrical cable. The submersible mixer may also comprise a control unit, such as an intelligent drive or VFD, located inside the liquid tight housing. The components of the mixer are usually cooled down by means of the liquid surrounding the mixer. It shall also be pointed out that the mixer may be configured to be lowered into and hoisted from the tank by means of a guide rail assembly.

The mixer 1 comprises a stationary body 2 and a drive shaft 3 protruding from said stationary body 2. The drive shaft 3 is arranged to be driven in rotation by a motor (not disclosed) arranged in said stationary body 2. Said motor is preferably an electrical motor. The mixer 1 comprises a propeller 4 having a hub and blades/vanes extending in the radial direction from said hub. Thereto, the mixer 1 comprises a clamping sleeve assembly arranged between the drive shaft 3 and the propeller 4 interconnecting them to each other in order to transmit a rotational motion from the mixer drive shaft 3 to the propeller 4.

The drive shaft 3 presents a free end having the shape of a truncated circular cone, converging in the distal direction. The drive shaft 3 constitutes the first element of the mixer that is about to be interconnected. The propeller 4 is provided with a central through hole 5, extending in the axial direction through the hub of the propeller 4. The central through hole 5 has a first portion 5a having a first diameter and a second portion 5b having a second diameter, wherein the second diameter is smaller than the first diameter. At the transition between the first portion 5a and the second portion 5b, the propeller 4 has a stop surface 6 facing the first portion 5a of the central through hole 5. The first portion 5a of the central through hole 5 preferably has a cylindrical shape. The propeller 4 constitutes the second element of the mixer that is about to be interconnected.

The clamping sleeve assembly comprises an inner clamping sleeve 7 and an outer clamping sleeve 8, which are configured to be connected in series between and interconnecting the drive shaft 3 and the propeller 4, in order to transmit a rotational motion. The inner clamping sleeve 7 has the shape of a tubular wall 9 having an inner surface 10 abutting the drive shaft 3 and an outer surface 11 abutting the outer clamping sleeve 8, and the outer clamping sleeve 8 has the shape of a tubular wall 12 having an inner surface 13 abutting the inner clamping sleeve 7 and an outer surface 14 abutting the propeller 4. The clamping sleeve assembly is configured to be located in the first portion 5a of the central through hole 5 of the propeller 4.

The clamping sleeve assembly has an axial clamping length L, said axial clamping length L is the extension in the axial direction wherein the drive shaft 3 abuts the inner surface 10 of the inner clamping sleeve 7, the outer surface 11 of the inner clamping sleeve 7 abuts the inner surface 13 of the outer clamping sleeve 8, and the outer surface 14 of the outer clamping sleeve 8 abuts the propeller 4, when the mixer is ready for operation. Thus, along the axial clamping length L the four elements abut and overlap each other. It shall be pointed out that the outer clamping sleeve 8 may abut the propeller 4 along a longer axial extent than said axial clamping length L, and that the inner clamping sleeve 7 may abut the outer clamping sleeve 8 along a longer axial extent than said axial clamping length L. Thus, in other words the outer surface 14 of the outer clamping sleeve 8 is configured to abut the propeller 4 at least along said axial clamping length L and the inner surface 10 of the inner clamping sleeve 7 is configured to abut the drive shaft 3 at least along said axial clamping length L.

Figure 3:
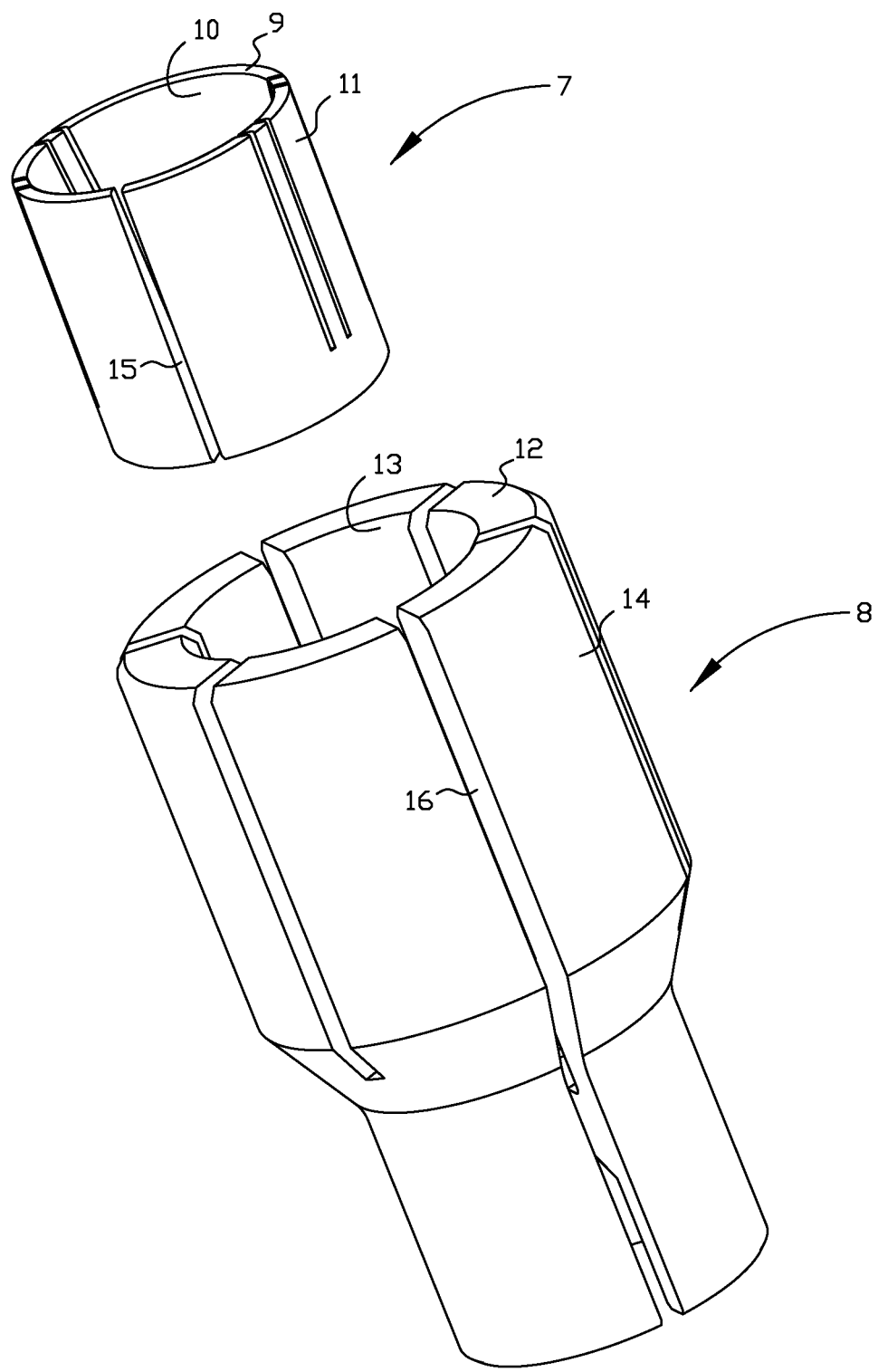
FIG. 3 is a schematic perspective view of a clamping sleeve assembly configured to interconnect the mixer drive shaft and the propeller.

Reference is now also made to FIG. 3, disclosing a perspective view of a preferred embodiment of the clamping sleeve assembly.

It is essential for the present invention that both the inner surface 13 of the outer clamping sleeve 8 and the outer surface 11 of the inner clamping sleeve 7 are cylindrical along said axial clamping length L, wherein the outer diameter of the inner clamping sleeve 7 is less than the inner diameter of the outer clamping sleeve 8 when both are unloaded, in order to allow unrestricted mutual telescopic displacement of the inner clamping sleeve 7 and the outer clamping sleeve 8 during mounting and demounting of the propeller 4. Thereto, the inner surface 10 of the inner clamping sleeve 7, along said axial clamping length L, has the shape of a truncated cone diverging towards a first end of the inner clamping sleeve 7, in order to fit onto and engage the free end of the drive shaft 3. The angle of the inner surface 10 of the inner clamping sleeve 7 shall match the angle of the truncated cone of the free end of the drive shaft 3. Thereto, the tubular wall 9 of the inner clamping sleeve 7 comprises a slot 15 extending along the entire axial length of the inner clamping sleeve 7 and the tubular wall 12 of the outer clamping sleeve 8 comprises a slot 16 extending along the entire axial length of the outer clamping sleeve 8, in order to obtain uniform expansion of the inner clamping sleeve 7 and of the outer clamping sleeve 8 in the radial direction along said axial clamping length L. The outer surface 14 of the outer clamping sleeve 8 is preferably cylindrical along said axial clamping length L, but according to an alternative embodiment the outer surface 14 of the outer clamping sleeve 8 is in the shape of a truncated cone along said axial clamping length L.

During mounting the mixer 1 is oriented in a vertical direction, i.e. having the drive shaft 3 protruding upwards from the stationary body 2 (oil housing), as shown in FIGS. 1 and 2.

The inner clamping sleeve 7 is fitted onto the drive shaft 3, such that the inclined inner surface 10 of the inner clamping sleeve 7 abut the conical free end of the drive shaft 3. Thereafter, an attachment/fastening screw 17 having an external thread is freely guided through the tubular wall 9 of the inner clamping sleeve 7 and into engagement with an axially extending central bore 18 having an internal thread and arranged in the free end of the drive shaft 3. The head of the attachment screw 17 is configured to interact with a second end of the inner clamping sleeve 7, either direct or indirect via a washer 19. The attachment screw 17 shall not be tighten yet, but it is allowed for the head of the attachment screw 17 to contact the drive shaft 3, or the washer 19.

The outer clamping sleeve 8 comprises a bore 20 delimited by the inner surface 13 of the outer clamping sleeve 8 and extending from a first end of the outer clamping sleeve 8 towards a second end of the outer clamping sleeve 8. Said bore 20 ending at a first stop surface 21 configured to interact with the second end of the inner clamping sleeve 7, either direct or indirect via the washer 19. Thus, the outer clamping sleeve 8 is fitted onto the inner clamping sleeve 7, such that the second end of the inner clamping sleeve 7 abut the first stop surface 21 of the outer clamping sleeve 8 via said washer 19. Said first stop surface 21 delimit an internal recess 22 configured to receive/house the head of the attachment screw 17. Said internal recess 22 is accessible from the second end of the outer clamping sleeve 8 by means of a suitable tool (not shown) configured to manipulate the attachment screw 17. The tool is preferably an Allen key.

It shall be pointed out that the internal recess 22 of the outer clamping sleeve 8 is accessible from the outside of the propeller 4 via the second portion 5b of the central through hole 5 of the propeller 4. Said second portion 5b of the central through hole 5 of the propeller 4 is closed by means of a cap 23 in FIG. 1.

Thereafter, the propeller 4 is fitted onto the outer clamping sleeve 8, i.e. the outer clamping sleeve 8 is inserted into the first portion 5a of the central through hole 5 of the propeller 4 until the second end of the outer clamping sleeve 8 abut the stop surface 6. The axial distance between the hub of the propeller 4 and the stationary part 2 of the mixer 1 is now the smallest, before tightening of the attachment screw 17. If a greater axial distance is required one or more shims may be arranged on top of the second end of the outer clamping sleeve 8 before fitting the propeller 4, such that said shims will be located between the stop surface 6 of the central through hole 5 of the propeller 4 and the second end of the outer clamping sleeve 8.

Thereafter, the attachment screw 17 is tightened using a prescribed torque and tightening sequence. Upon tightening of the attachment screw 17, the inner clamping sleeve 7 is pressed onto the drive shaft 3 resulting in expansion of the inner clamping sleeve 7 in the radial direction, i.e. the outer diameter of the inner clamping sleeve 7 increase. The inner clamping sleeve 7 engages the outer clamping sleeve 8 and a further tightening of the attachment screw 17 result in an expansion of the inner clamping sleeve 7 and the outer clamping sleeve 8 in the radial direction, i.e. the outer diameter of the outer clamping sleeve 8 increase and clamps/locks the propeller 4.

According to a preferred embodiment the outer clamping sleeve 8 comprises a second stop surface 24 configured to be engaged by the top of the head of the attachment screw 17 during demounting of the propeller 4. The second stop surface 24 is located in the internal recess 22 of the outer clamping sleeve 8. More precisely, in most cases when the attachment screw 17 is loosened the friction between the drive shaft 3 and the inner clamping sleeve 7 may prevent the inner clamping sleeve 7 to automatically be displaced in the direction away from the stationary part 2 of the mixer 1, i.e. the propeller 4 is still clamped to the drive shaft 3. In such cases the attachment screw 17 is loosened further until the head of the attachment screw 17 abut the second stop surface 24. Upon further loosening of the attachment screw 17 the outer clamping sleeve 8 together with the propeller 4 and the inner clamping sleeve 7 are forced in the direction away from the stationary part 2 of the mixer 1, resulting in a contraction of the inner clamping sleeve 7 and of the outer clamping sleeve 8 whereupon the propeller 4 is unclamped/loose.

Different embodiments and extra features of the inner clamping sleeve 7 and the outer clamping sleeve 8, respectively, will now be described with reference to FIGS. 4a-11b. FIGS. 4a-7b discloses four exemplifying embodiments of the outer clamping sleeve 8, and FIGS. 8a-11b discloses four exemplifying embodiments of the inner clamping sleeve 7. It shall be pointed out that the explicitly disclosed embodiments are only examples, and other embodiments meeting the limitations of the independent claims are also conceivable.

According to a preferred embodiment the tubular wall 12 of the outer clamping sleeve 8 comprises at least one slit 25 extending from the first end of the outer clamping sleeve 8 towards the first stop surface 21 of the outer clamping sleeve 8. Preferably at least one slit 25 extend past said first stop surface 21. In the shown embodiments, the longitudinal extension of each slit 25 is parallel to the axial axis of the outer clamping sleeve 8, as is seen from the outside of the outer clamping sleeve 8. However, the longitudinal extension of the slits 25 may be in any other suitable shape, e.g. helical, zigzag, etc. The fourth embodiment according to FIGS. 7a and 7b does not comprise such a slit.

Figure 4B:
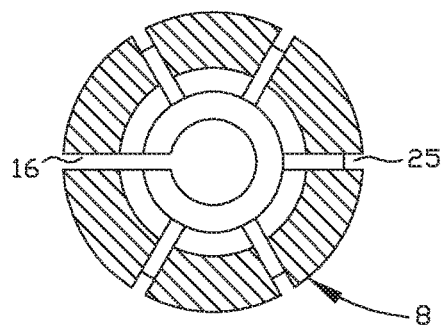
FIG. 4b is a schematic cross sectional view seen in the axial direction of the outer clamping sleeve disclosed in FIG. 4a, FIG. 5a is a schematic partial cross sectional side view of an outer clamping sleeve according to a second embodiment.
Figure 4A:
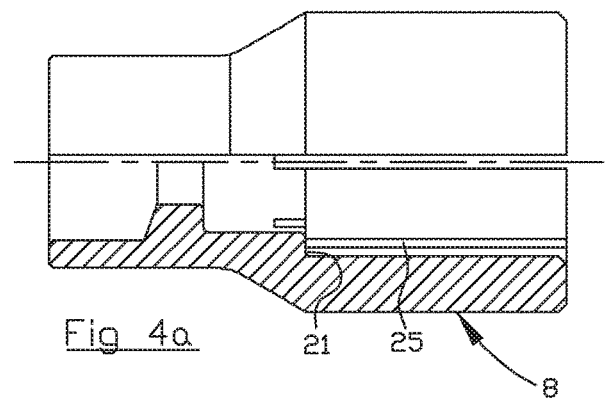
FIG. 4a is a schematic partial cross sectional side view of an outer clamping sleeve according to a first embodiment.
Figure 5B:
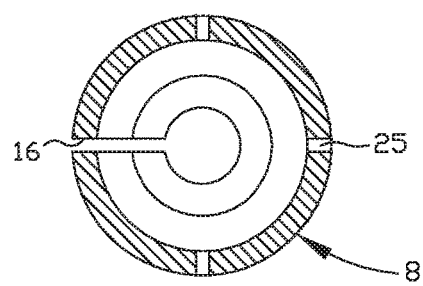
FIG. 5b is a schematic cross sectional view seen in the axial direction of the outer clamping sleeve disclosed in FIG. 5a, FIG. 6a is a schematic partial cross sectional side view of an outer clamping sleeve according to a third embodiment.
Figure 5A:
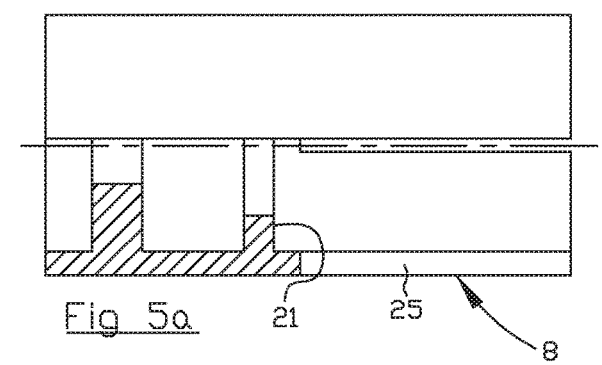
Figure 6B:
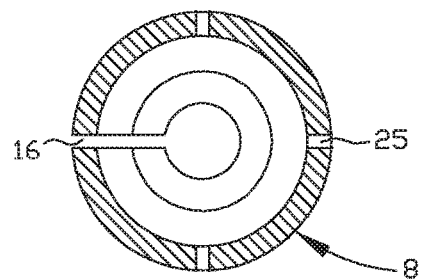
FIG. 6b is a schematic cross sectional view seen in the axial direction of the outer clamping sleeve disclosed in FIG. 6a, FIG. 7a is a schematic partial cross sectional side view of an outer clamping sleeve according to a forth embodiment.
Figure 6A:
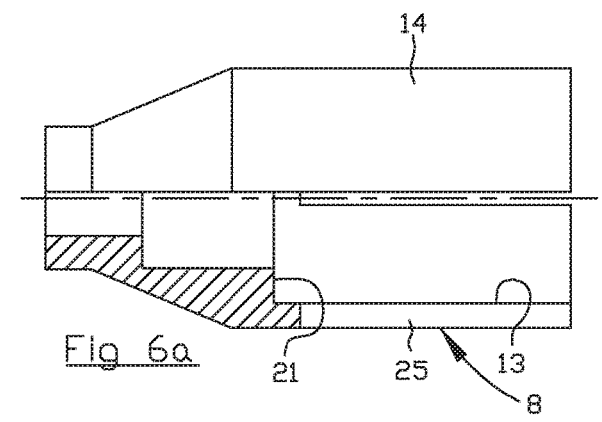
Figure 7B:
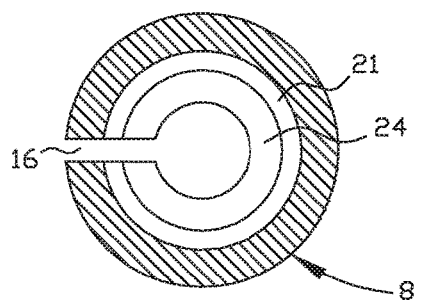
FIG. 7b is a schematic cross sectional view seen in the axial direction of the outer clamping sleeve disclosed in FIG. 7a, FIG. 8a is a schematic partial cross sectional side view of an inner clamping sleeve according to a first embodiment.
Figure 7A:
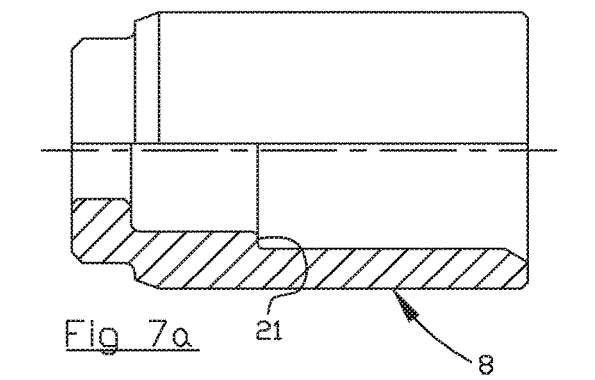

According to the most preferred embodiment of the outer clamping sleeve 8, shown in FIGS. 4a and 4b, the tubular wall 12 of the outer clamping sleeve 8 comprises five slits that together with the slot 16 of the outer clamping sleeve 8 are equidistantly distributed along the circumferential direction of the tubular wall 12 of the outer clamping sleeve 8. The more slits 25 the lower force needed to expand the segments of the tubular wall 12 having a certain thickness in the radial direction. However, it is preferred that the extension of each segment of the tubular wall 12 in the circumferential direction, taken at the inner surface 13 of the outer clamping sleeve 8, is greater than the radial thickness thereof, i.e. the inner arc length of the tubular wall segment is greater than the radial thickness. If the inner arc length becomes too small the rigidity of the outer clamping sleeve 8 will decrease. According to an alternative embodiment at least one extra slit (not shown) may extend from the second end of the outer clamping sleeve 8 towards the first end of the outer clamping sleeve 8.

According to a preferred embodiment the tubular wall 9 of the inner clamping sleeve 7 comprises at least one slit 26 extending from the first end of the inner clamping sleeve 7 towards the second end of the inner clamping sleeve 7. In the shown embodiments, the longitudinal extension of each slit 26 is parallel to the axial axis of the inner clamping sleeve 7, as is seen from the outside of the inner clamping sleeve 7. However, the longitudinal extension of the slits 26 may be in any other suitable shape, e.g. helical, zigzag, etc. The fourth embodiment according to FIGS. 11a and 11b does not comprise such a slit. According to an alternative embodiment at least one extra slit (not shown) may extend from the second end of the inner clamping sleeve 7 towards the first end of the inner clamping sleeve 7.

Figure 8A:
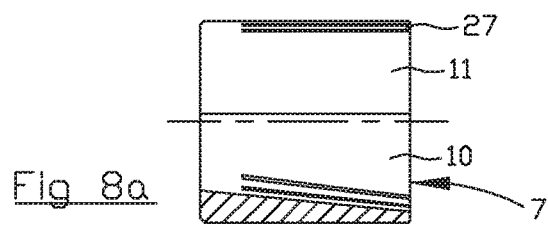
FIG. 8b is a schematic cross sectional view seen in the axial direction of the inner clamping sleeve disclosed in FIG. 8a, FIG. 9a is a schematic partial cross sectional side view of an inner clamping sleeve according to a second embodiment.
Figure 8B:
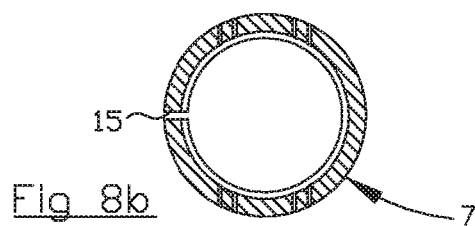
Figure 9A:
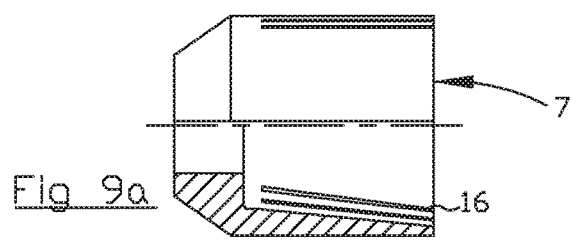
FIG. 9b is a schematic cross sectional view seen in the axial direction of the inner clamping sleeve disclosed in FIG. 9a, FIG. 10a is a schematic partial cross sectional side view of an inner clamping sleeve according to a third embodiment.
Figure 9B:
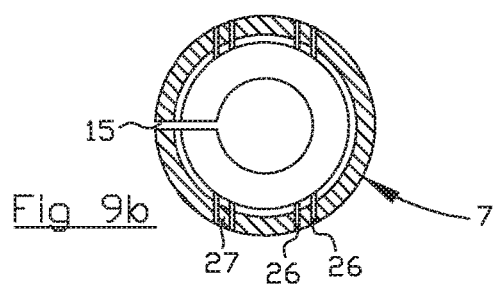
Figure 10A:
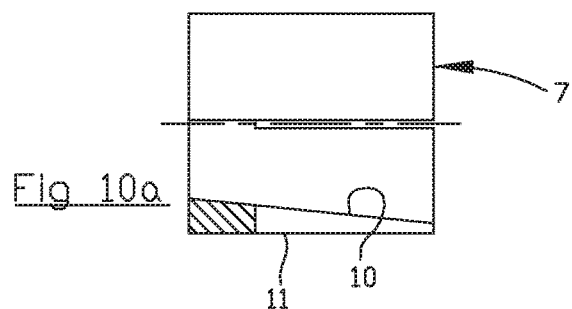
FIG. 10b is a schematic cross sectional view seen in the axial direction of the inner clamping sleeve disclosed in FIG. 10a, FIG. 11a is a schematic partial cross sectional side view of an inner clamping sleeve according to a forth embodiment.
Figure 10B:
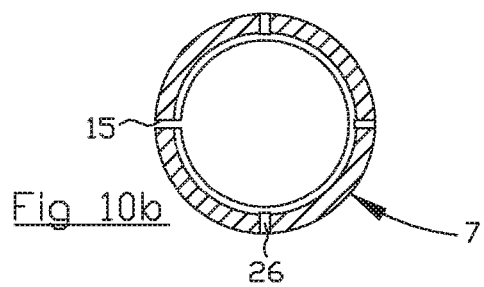
Figure 11A:
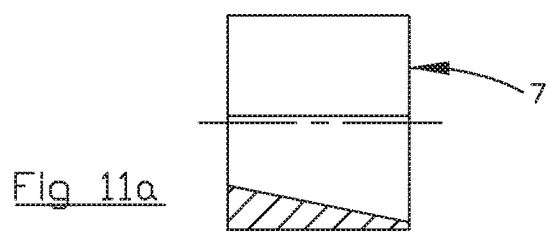
Figure 11B:
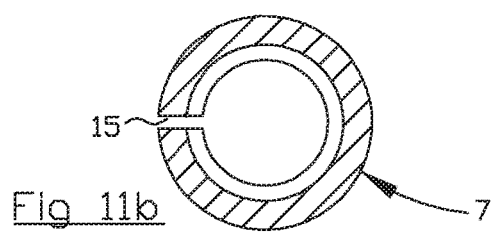

According to the most preferred embodiment of the inner clamping sleeve 7, shown in FIGS. 8a and 8b, the entire inner surface 10 of the tubular wall 9 of the inner clamping sleeve 7 has the shape of a truncated cone. The inclination of the conical inner surface 10 of the tubular wall 9 of the inner clamping sleeve 7, in relation to an axial center axis, is preferably above 3° and below 10°, and is in the shown embodiment approximately 6°.

According to the preferred embodiment, said tubular wall 9 of the inner clamping sleeve 7 comprise at least one pair of slits 26, which slits 26 are adjacent to each other and extends from said first end of the inner clamping sleeve 7 towards said second end. Thus a finger shaped segment 27 of the tubular wall 9 is obtained, said segment 27 is deflectable in the circumferential direction in relation to neighboring parts of said tubular wall 9. The term "deflectable" is used meaning that the segment 27 may bend towards the neighboring parts as well as twist in relation to the neighboring parts. The term "finger shaped" entails that the extension of the segment 27 of the tubular wall 9 in the circumferential direction, taken at the inner surface 10 of the inner clamping sleeve 7 at the base of the segment 27, is less than the radial thickness thereof, i.e. the inner arc length of the tubular wall segment 27 is less than the radial thickness at the base of the segment 27.

As the inner clamping sleeve 7 is located between the drive shaft 3 and the outer clamping sleeve 8, the finger shaped segment 27 as well as the neighboring parts of the tubular wall 9 will be squeezed in the radial direction between the envelope surface of the drive shaft 3 and the inner surface 13 of the outer clamping sleeve 8. If the propeller 4 is subject to a high momentary resistance, or the drive shaft 3 is started to rotate with a jerk or the propeller 4 is subjected to a jerk, the outer clamping sleeve 8 may slip in relation to the drive shaft 3. When using an inner clamping sleeve 7 according to the preferred embodiment disclosed in FIGS. 8a and 8b, the function of the finger shaped segment 27 is to at least partly follow the mutual movement of the outer clamping sleeve 8 in relation to the drive shaft 3 and bend in the circumferential direction towards the neighboring part of the tubular wall 9. The bending of the finger shaped segment 27 intensifies the frictional force between the inner clamping sleeve 7 and the outer clamping sleeve 8 and the drive shaft 3, respectively, due to the changed geometrical condition of the finger shaped segment 27.

Preferably the radial extension of at least one slit 26 of each pair of slits, will coincide whit a geometrical plane, which is separated from the axial axis of the inner clamping sleeve 7. In other words, the surfaces of the slit 26 will be at an angle in relation to the tangent of the outer surface 11 of the tubular wall 9, which angle is separate from 90°. When the finger shaped segment 27 is bent towards the neighboring part of the tubular wall 9 and comes into contact, the two abutting surfaces which are inclined in relation to the circumferential direction of the tubular wall will force the finger shaped segment 27 to "climb up" on the neighboring part of the tubular wall 9, and be wedged between the neighboring part of the tubular wall 9 and the drive shaft 3 or the outer clamping sleeve 8 in order to increase the frictional force. This may be done by entire finger shaped segment 27 is bent outwards and/or that the finger shaped segment 27 is twisted.

Preferably, the two slits 26 of each pair of slits are parallel to each other. However, the respective geometrical plane in which each slit 26 is included may intersect each other. Furthermore, the tubular wall 9 may comprise at least two pairs of slits, which pairs are distributed along the periphery of said tubular wall 9. Preferably, the tubular wall 9 comprises four pairs of slits, which are arranged such that two opposite slits 26 from two different pairs of slits coincide with the same geometrical plane and may thus be cut at the same time. It shall be pointed out that preferably all slits 26 extends from the first end of the inner clamping sleeve 7, even though several pairs of slits are provided.

It shall be pointed out that the present invention might be less suitable for frequent exchange of propellers, but allows the flexibility of interconnecting different sized propellers to a drive shaft while still ensuring a very good and reliable connection and force/load transmission. In the case a small propeller is used, i.e. a propeller having a less diameter through hole, the outer clamping sleeve is spared and only the inner clamping sleeve is used between the drive shaft and the propeller.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equipment may be modified in all kinds of ways within the scope of the appended claims.

It shall also be pointed out that all information about/ concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. A mixer for generating a flow of liquid, the mixer comprising:
    a stationary body, an axially extending drive shaft protruding from said stationary body, a propeller, an attachment screw having a head with a top, and a clamping sleeve assembly configured to interconnect the drive shaft and the propeller with each other in order to transmit a rotational motion,
    wherein the clamping sleeve assembly has an axial clamping length (L),
    wherein the clamping sleeve assembly comprises an inner clamping sleeve and an outer clamping sleeve,
    wherein the inner clamping sleeve has the shape of a tubular wall and includes an inner surface abutting the drive shaft and an outer surface abutting the outer clamping sleeve,
    wherein the attachment screw is configured to secure the inner clamping sleeve to the drive shaft,
    wherein the outer clamping sleeve has the shape of a tubular wall and includes an inner surface abutting the inner clamping sleeve and an outer surface abutting the propeller, and the outer clamping sleeve comprises a bore delimited by the inner surface of the outer clamping sleeve and extending from a first end of the outer clamping sleeve towards a second end of the outer clamping sleeve, said bore ending at a first stop surface configured to directly or indirectly engage a second end of the inner clamping sleeve, and the outer clamping sleeve further comprises a second stop surface configured to be engaged by the top of the head of the attachment screw during demounting of the clamping sleeve assembly,
    wherein both the inner surface of the outer clamping sleeve and the outer surface of the inner clamping sleeve are cylindrical along the axial clamping length (L),
    wherein the inner surface of the inner clamping sleeve, along the axial clamping length (L), has the shape of a truncated cone diverging towards a first end of the inner clamping sleeve,
    wherein an outer diameter of the inner clamping sleeve is less than an inner diameter of the outer clamping sleeve when the outer clamping sleeve and the inner clamping sleeve are unloaded,
    wherein the tubular wall of the inner clamping sleeve comprises a slot extending along an entire axial length of the inner clamping sleeve, and
    wherein the tubular wall of the outer clamping sleeve comprises a single slot extending along an entire axial length of the outer clamping sleeve.

2. The mixer according to claim 1, wherein the outer surface of the outer clamping sleeve is cylindrical along said axial clamping length (L).

3. The mixer according to claim 1, wherein an entire inner surface of the inner clamping sleeve has the shape of a truncated cone.

4. The mixer according to claim 1, wherein the tubular wall of the outer clamping sleeve comprises at least one slit extending from the first end of the outer clamping sleeve towards the first stop surface of the outer clamping sleeve.

5. The mixer according to claim 4, wherein the tubular wall of the outer clamping sleeve comprises five slits that together with the slot of the outer clamping sleeve are equidistantly distributed along a circumferential direction of the tubular wall of the outer clamping sleeve.

6. The mixer according to claim 1, wherein the tubular wall of the inner clamping sleeve comprises at least one slit extending from the first end of the inner clamping sleeve towards a second end of the inner clamping sleeve.

7. The mixer according to claim 1, wherein the tubular wall of the inner clamping sleeve comprises at least one pair of slits extending from the first end of the inner clamping sleeve towards a second end of the inner clamping sleeve, thereby providing a finger shaped segment of the tubular wall of the inner clamping sleeve delimited by the slits of the pair of slits.

8. The mixer according to claim 7, wherein a radial extension of each slit of the pair of slits coincides with a geometrical plane that is separated from an axial center axis of the clamping sleeve assembly.

9. The mixer according to claim 7, wherein the slits of the at least one pair of slits are parallel to each other.

10. The mixer according to claim 1, wherein the slot extending along the entire axial length of the inner clamping sleeve is the only slot extending along the entire axial length of the inner clamping sleeve.

\* \* \* \* \*